United States Patent
Govindan et al.

(10) Patent No.: US 7,430,495 B1
(45) Date of Patent: Sep. 30, 2008

(54) METHOD AND APPARATUS FOR REPRESENTING, MANAGING, ANALYZING AND PROBLEM REPORTING IN HOME NETWORKS

(75) Inventors: Rajeev Govindan, Parlin, NJ (US); Thomas Giglia, Mahopac, NY (US); William Kuhhirte, Redington Shores, FL (US); Ehud Kleers, Elmsford, NY (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/638,125

(22) Filed: Dec. 13, 2006

(51) Int. Cl.
*G06F 11/00* (2006.01)
*G06F 17/00* (2006.01)

(52) U.S. Cl. .................. 702/183; 702/182; 702/185; 714/37

(58) Field of Classification Search ............ 702/183
See application file for complete search history.

(56) References Cited

U.S. PATENT DOCUMENTS

| | | | |
|---|---|---|---|
| 5,263,123 A * | 11/1993 | Hayashi | 706/45 |
| 5,528,516 A * | 6/1996 | Yemini et al. | 702/181 |
| 5,661,668 A | 8/1997 | Yemini | |
| 6,249,755 B1 | 6/2001 | Yemini | |
| 6,868,367 B2 | 3/2005 | Yemini | |
| 7,003,433 B2 | 2/2006 | Yemini | |
| 7,107,185 B1 | 9/2006 | Yemini | |
| 2006/0053456 A1 * | 3/2006 | Kelly | 725/87 |
| 2006/0129998 A1 * | 6/2006 | Florissi et al. | 717/127 |

OTHER PUBLICATIONS

U.S. Appl. No. 11/325,050, Florissi, P.
U.S. Appl. No. 10/813,842, Yemini, S.
U.S. Appl. No. 11/494,250, Yemini, Y.

* cited by examiner

*Primary Examiner*—Hal D Wachsman
(74) *Attorney, Agent, or Firm*—Krishnendu Gupta; Robert Kevin Perkins; Joseph J. D'Angelo

(57) ABSTRACT

A method and apparatus for logically representing and performing an analysis on a home network is disclosed. The method comprising the steps of representing selected ones of a plurality of components and the relationship among the components associated with the home network, providing a mapping between a plurality of events and a plurality of observable events occurring among the components, wherein the mapping is represented as a value associating each event with each observable event, and performing a system analysis based on the mapping of events and observable events. In another aspect of the invention, the home network is included in a larger system logically represented as a plurality of domains, wherein at least one of the plurality of components in the network is associated with at least two of the domains.

20 Claims, 9 Drawing Sheets

| CLASS | PROBLEM | CAUSES/IMPACTS | COMMENT |
|---|---|---|---|
| ACS | ResourceException | STB DOWN | |
| DLSAM | DOWN | VoIPSvc DOWN<br>VoDSvc DOWN<br>STB DOWN | |
| STB | PossibleSignalDegraded | VoDSvc DEGRADED | |
| HBR | UNRESPONSIVE | STB DOWN | |

FIG. 5A

| SYMPTOMS \ PROBLEMS | STBisDown | STBHighResourceUtilization | STBSignalDegraded |
|---|---|---|---|
| VOD-SvcDown | 1 | | |
| RtiPTV-SvcDown | 1 | | |
| VOD-Svc_Degraded | | 1 | 1 |
| RtiPTV-Svc_Degraded | | 1 | 1 |
| STBDown | 1 | | |
| HighResourceUtilization | | 1 | |
| STBDegradedEvent | | | 1 |
| HBRDown | | | |
| STBImpactecByHBR | | | |
| VOD-SvcImpactedByUpstreamProblem | | | |
| RtiPTV-SvcImpactedByUpstreamProblem | | | |
| VOIP-SvcDown | | | |
| VOIP-Svc_Degraded | | | |
| HighPacketRate | | | |
| ONTDown | | | |
| STBImpactedByUpstreamProblem | | | |
| HBRImpactedByUpstreamProblem | | | |
| VOIP-SvcImpactedByUpstreamProblem | | | |
| OLTDown | | | |
| DSLDown | | | |
| DSLAMDown | | | |
| ACSDown | | | |

| HBR-Down | HBRHighPacketRate | ONTisDown | OLTisDown | DSLisDown | DSLAM-Down | ACS-Down |
|---|---|---|---|---|---|---|
| | | | | | | |
| | | | | | | |
| | 1 | | | | | |
| | 1 | | | | | |
| | | | | | | |
| | 1 | | | | | |
| 1 | | | | | | |
| 1 | | | | | | |
| 1 | | | | | | |
| 1 | | | | | | |
| 1 | | | | | | |
| | | | | | | |
| | 1 | | | | | |
| | 1 | | | | | |
| | | 1 | 1 | 1 | 1 | 1 |
| | | 1 | 1 | 1 | 1 | 1 |
| | | | | | | |
| | | | | | | |
| | | 1 | 1 | 1 | 1 | 1 |
| | | 1 | 1 | 1 | 1 | 1 |
| | | 1 | 1 | 1 | 1 | 1 |
| | | | | 1 | 1 | |
| | | | | | 1 | |
| | | | | | | 1 |

FIG. 5B-I

METHOD AND APPARATUS FOR REPRESENTING, MANAGING, ANALYZING AND PROBLEM REPORTING IN HOME NETWORKS

RELATED APPLICATIONS

This application is related to:

co-pending U.S. patent application Ser. No. 11/494,250, entitled, "Apparatus and Method for Event Correlation and Problem Reporting," filed on Jul. 27, 2006, which is a continuation of:

U.S. patent application Ser. No. 11/263,689, entitled, "Apparatus and Method for Event Correlation and Problem Reporting," filed on Nov. 1, 2005, now U.S. Pat. No. 7,107,185, which is a continuation of:

U.S. patent application Ser. No. 11/034,192, entitled "Apparatus and Method for Event Correlation and Problem Reporting," filed on Jan. 12, 2005, now U.S. Pat. No. 7,003,433, which is a continuation of:

U.S. patent application Ser. No. 10/400,718, entitled, "Apparatus and Method for Event Correlation and Problem Reporting," filed on Mar. 27, 2003, now U.S. Pat. No. 6,868,367, which is a continuation of:

U.S. patent application Ser. No. 09/809,769 filed on Mar. 16, 2001, now abandoned, which is a continuation of:

U.S. patent application Ser. No. 08/893,263, entitled, "Apparatus and Method for Event Correlation and Problem Reporting," filed on Jul. 15, 1997, now U.S. Pat. No. 6,249,755, which is a continuation of:

U.S. patent application Ser. No. 08/679,443, entitled, "Apparatus and Method for Analyzing and Correlating Events in a System using a Causality Matrix," filed on Jul. 12, 1996, now U.S. Pat. No. 5,661,668, which is a continuation of:

U.S. patent application Ser. No. 08/465,754, filed on Jun. 6, 1995, now abandoned, which is a continuation of:

U.S. patent application Ser. No. 11/494,250, entitled, "Apparatus and Method for Event Correlation and Problem Reporting," filed on May 25, 1994, now U.S. Pat. No. 5,528,516, co-pending U.S. patent application Ser. No. 11/325,050, entitled "Method and Apparatus for Representing, Managing and Problem Reporting in WDM Optical Networks," filed on Jan. 3, 2006, and co-pending U.S. patent application Ser. No. 10/813,842, entitled "Method and Apparatus for Multi-Realm System Modeling," filed on Mar. 31, 2004, the contents of all of which are incorporated by reference herein.

FIELD OF THE INVENTION

The invention relates generally to computer networks, and more specifically to apparatus and methods for modeling and analyzing home networks.

BACKGROUND OF THE INVENTION

FIG. 1A illustrates an exemplary embodiment of a service provider network 100, wherein a service provider 110 provides selected information or services to each of a plurality of home networks 150 through at least one communication path represented as networks 130 and 140. For example, the service provider 110 may provide selective services such as cable television, voice-over-IP (VoIP), video-on-demand (VoD), internet protocol television (IPTV) or internet access to each of the home networks. Providing services over either public or private networks is well-known in the art and need not be discussed in detail herein.

FIG. 1B illustrates a block diagram of an exemplary connection from the service provider network 100 to a conventional home network 150. In this exemplary connection, the network is composed of router(s) 170 that may be connected via electrical (not shown) or optical communication links 180 (Optical Network Terminal/Optical Line Terminal) to a point prior to entry to the home network 150. The home network 150 includes a network termination unit 190 that is used to provide compatibility of the elements or components of the home network 150 to the service provider network 100.

Home network 150 includes elements such as a DSL modem 151, broadband router(s) 152, set top boxes 153 and televisions 154 connected to an associated set-top box 153. The home network may further include a digital network that enables the connection of a VoIP phone 155 and internet access via PC 156. The digital network may also include an access point (not shown) that allows access to a wireless network 157 that further enables remote wireless (Wii, WiFi, Bluetooth) devices to be connected to the service provider network.

With the dynamic expansion of the services provided to home-based subscribers or users and the ability of the home-based user to dynamically change the configuration of the home network 150, the need for managing the network is increasingly more important both to the service provider 110 and the user. Failures in the network or reduced Quality of Service (Qos) in the reception of information significantly alters the user's experience in using the network while quickly determining the cause of failure or poor QoS is important to the service provider in maintaining a high QoS.

Hence, there is a need in the industry for a method and apparatus for analyzing and modeling home networks to determine causes of failures or reduced QoS in home networks and the impacts of such failures.

SUMMARY OF THE INVENTION

A method and apparatus for logically representing and performing an analysis on a home network is disclosed. The method comprising the steps of representing selected ones of a plurality of components and the relationship among the components associated with the home network, providing a mapping between a plurality of events and a plurality of observable events occurring among the components, wherein the mapping is represented as a value associating each event with each observable event, and performing a system analysis based on the mapping of events and observable events. In another aspect of the invention, a method and apparatus are disclosed for representing and performing an analysis on a home network wherein the home network is included in a larger system logically represented as a plurality of domains is disclosed. In this aspect of the invention, the method comprises the steps of representing selected ones of a plurality of components and relationship among the components, wherein at least one of the plurality of components is associated with at least two of the domains, providing a mapping between a plurality of events and a plurality of observable events occurring among the components, wherein the mapping is represented as a value associating each event with each observable event, and performing the system analysis based on the mapping of events and observable events.

DETAILED DESCRIPTION OF THE FIGURES

FIGS. 5A and 5B illustrate an exemplary home network object state diagram and diagnostic analysis in accordance with the principles of the invention;

FIG. 5B-I is a continuation of FIG. 5B; and

Figure 6:
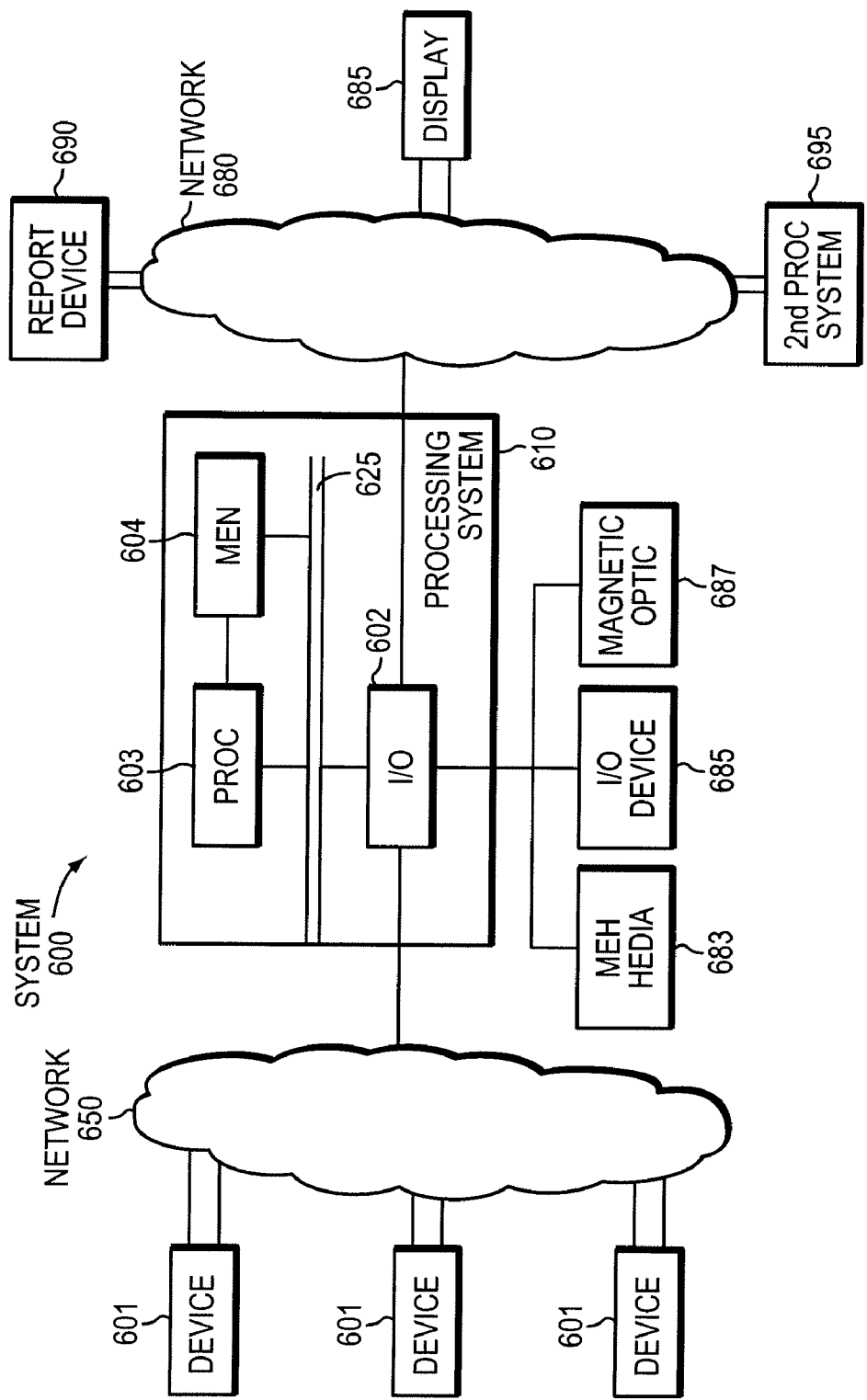

FIG. 6 illustrates a system implementing the processing shown herein.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Figure 1A:
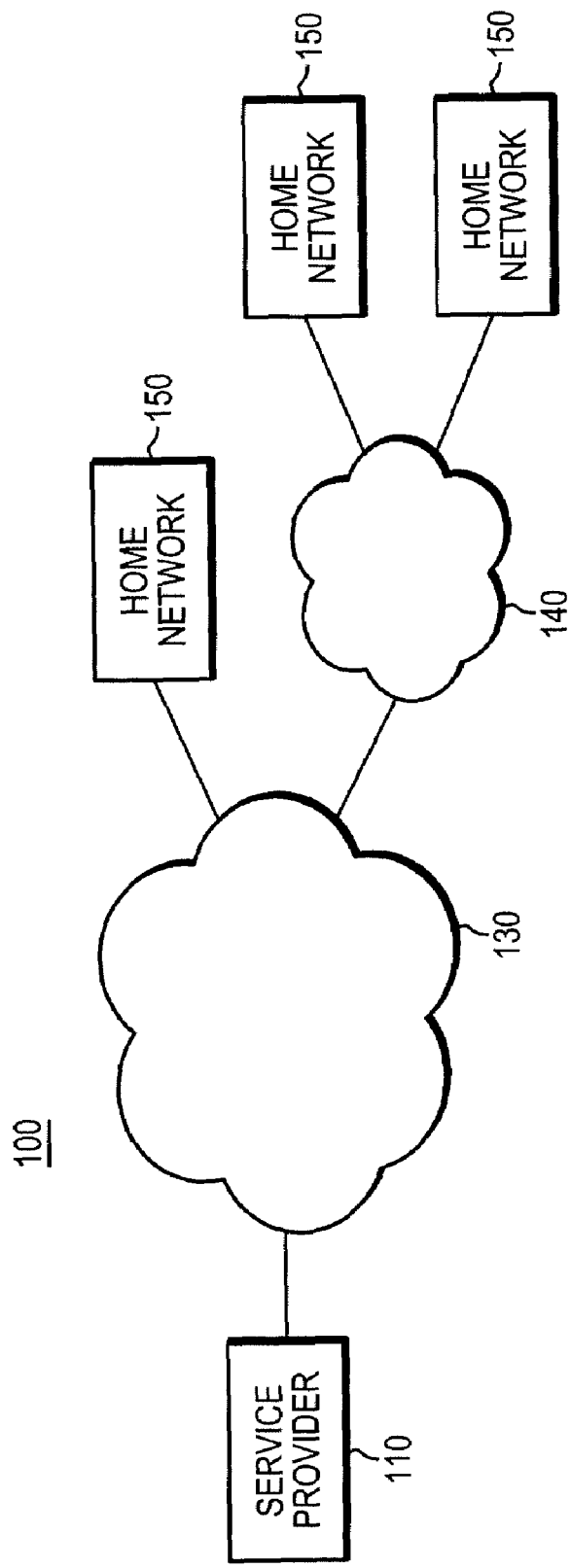
FIGS. 1A and 1B illustrate a conventional home network.
Figure 2:
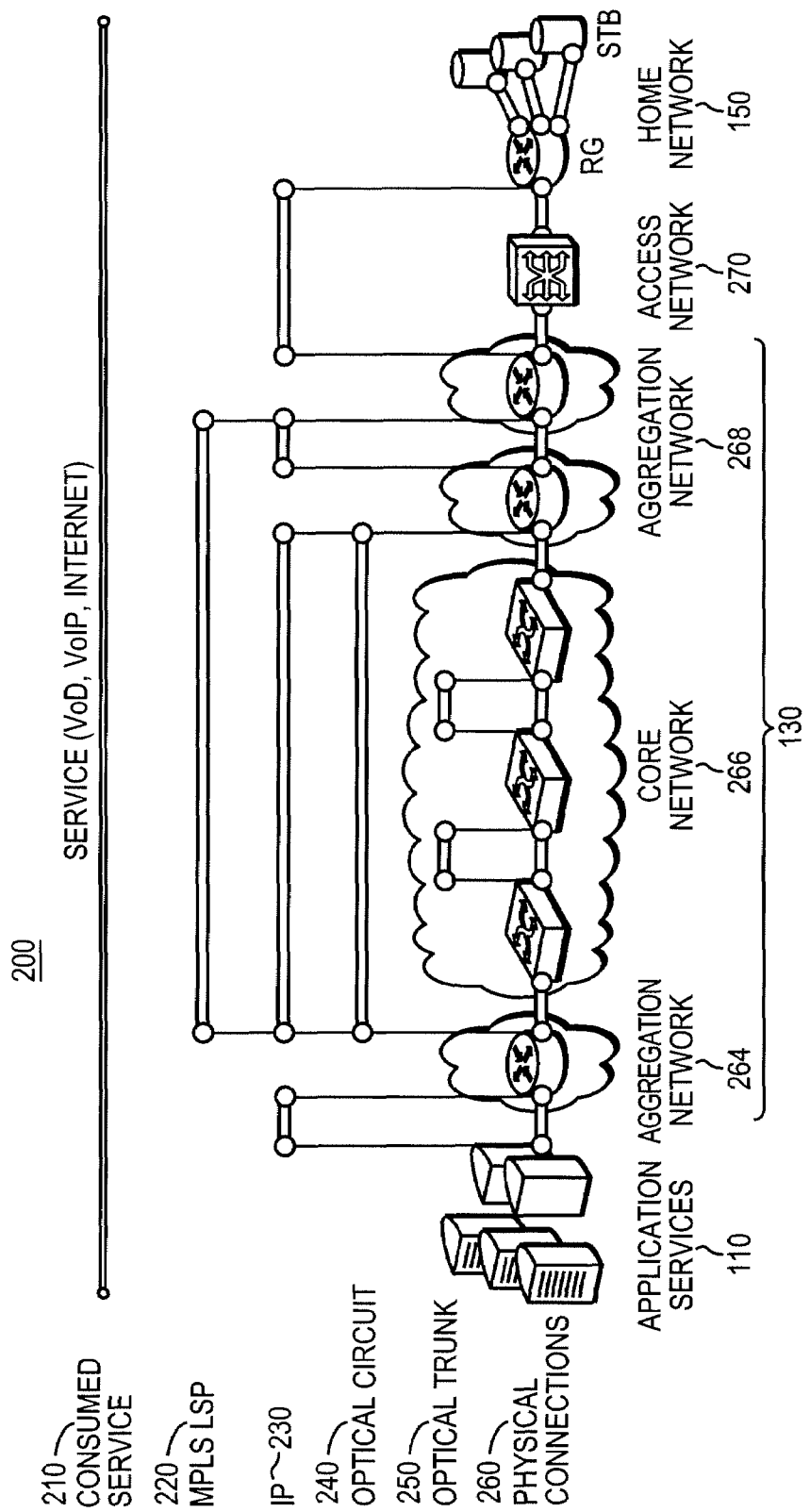
FIG. 2 illustrates underlying network elements for providing services to conventional home networks.

FIG. 2 illustrates a block diagram correlating the services provided 210, the transportation means (MPLS/LSP 220, IP 230, Optical Circuit 240) and the underlying physical components, Optical trunk 250 and physical components 260. The physical components 260 are further presented as application services 110 (see FIG. 1A), aggregation network 264, core network 266, aggregation network 268, access network 270 and the home network 150 (see FIG. 1A). The aggregation networks 264, 268 and the core network 266 represent the network 130 of FIG. 1A.

In this illustrated block diagram, a service, e.g., VoD, provided to a home network 150 by service provider 110 transits the networks using different protocols and physical means. For example, data associated with a VoD service from service provider 110 to aggregation network employs an IP protocol. The information may then be transmitted over an optical circuit using the IP protocol and may further be encoded or encapsulated in a Multi-Protocol Label Switching (MPLS) or Label Switch Path (LSP) protocol. IP protocol is well-known in the network art to allow the transportation of data packets over one or more connected networks. In the core network 266, optical truck lines 250 may be used to provide large bandwidths for the transportation of the data packets. MPLS/LSP 200 provide for the identification and designation of a data packet to a specific receiving system (e.g., a set-top box in a home network). IP and MPLS/LSP protocols are well-known in the art and need not be discussed in detail herein.

Determination of the causes of errors in the networks and/or associated IP, Optical and MPLS protocols is well-known in the art. For example, the commonly-owned U.S. Ser. No. 11/494,250, and U.S. Pat. Nos. 5,528,516; 5,661,668; 6,249,755; 6,868,367; 7,003,4333 and 7,107,185, the contents of which are incorporated by reference herein, describe performing a system analysis based on a mapping of observable events and detectable events, e.g., symptoms and problems, respectively, in IP-based networks. Similarly, commonly-owned U.S. Ser. No. 11/325,050, the contents of which are incorporated by reference herein, describe performing a system analysis based on a mapping of symptoms and problems in Optical-based networks.

However, the symptoms caused by problems or events in the home-based network are not readily known to the service provider. Thus, without observing symptoms that are occurring in the home-based network, the service provider is limited in the ability to determine the cause, or even prevent the observation, of a problem. The recent introduction of the TR-069 standard provides a method for the collection by the service provider of information within the home network. Returning to FIG. 1B, TR-069 compliant devices, e.g., DSL 151, router 152, may provide information to the service provider 110 via the network connection. The service provider accordingly has knowledge of the presence of the TR-069 devices in the associated network to allow for configuration of the home network. In addition, the communication link enables the service provider information from the TR-069 devices regarding the performance characteristics of the home network. For example, errors in QoS or incorrectly connected devices may be provided to the service provider in the form of symptoms or observed events. The provided events, in conjunction with additional observable events may be used to determine the cause of degradation in the QoS, for example, of an area of home networks, a specific home network or even a device within a home network.

UPnP (Universal Plug and Play) connectivity of additional devices to the home network affords the TR-069 devices the ability to provide information regarding the UPnP devices and the associated home network configuration to the service provider. Similarly, observed events generated from a connected device may be provided to the service provider to determine a most-likely cause of the generated observed event(s).

Figure 3:
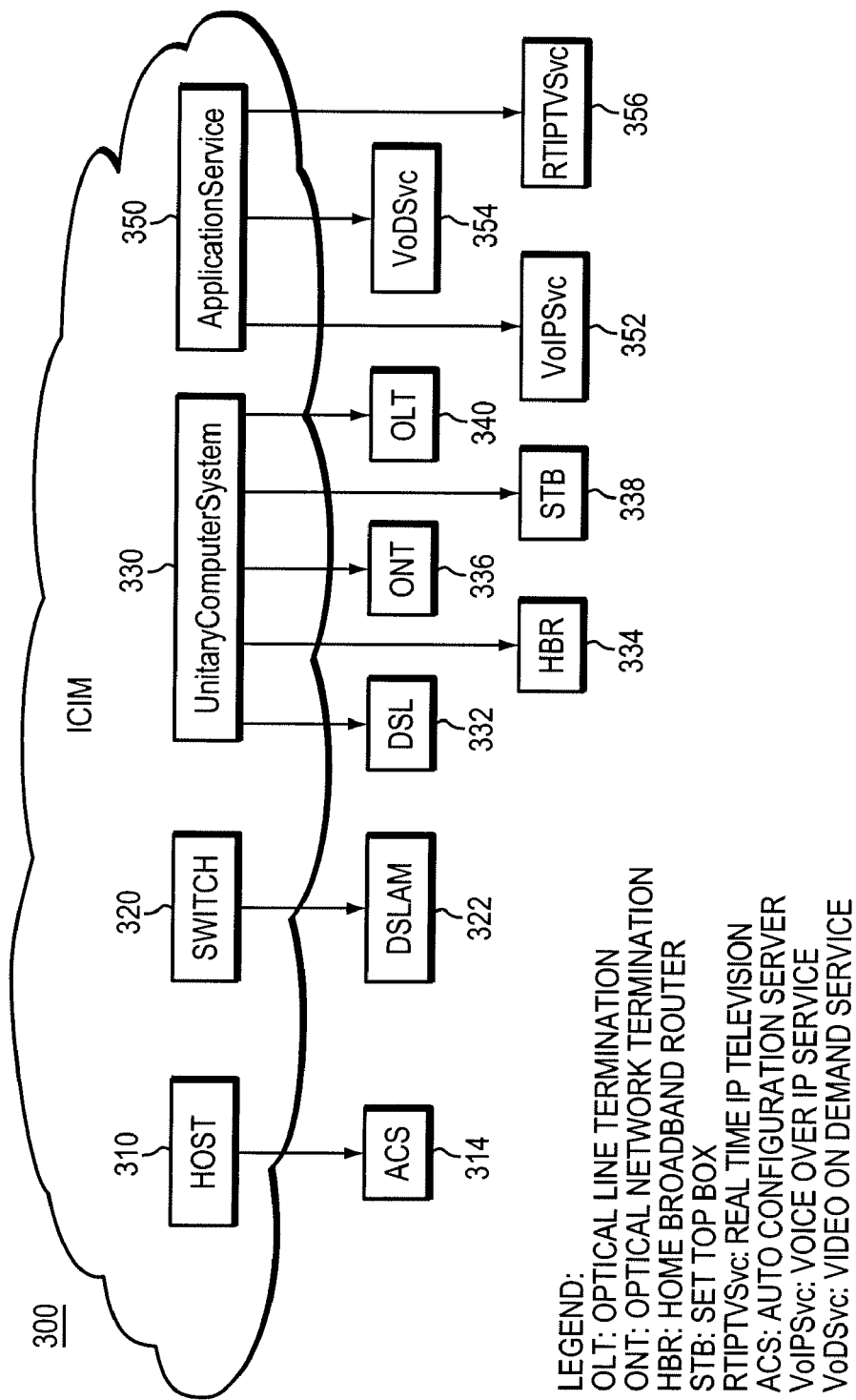
FIG. 3 illustrates a logical representation of an exemplary home network.

FIG. 3 illustrates an exemplary embodiment of model representation 300 of a home network 150 in accordance with the principles of the present invention. The model shown is an extension of known network models, such as the EMC® SMARTS® Common Information Model (ICIM), or similarly defined or pre-existing CIM-based model, adapted for the home network. EMC and SMARTS are trademarks of EMC Corporation, Inc., having a principle place of business in Hopkinton, Ma, USA. The model illustrated is an extension of the DMTF/SMI model. Model based system representation is discussed in commonly-owned aforementioned US patents and patent applications.

Model 300 represents a managed system containing selected ones of the physical network components, e.g., nodes, routers, computer systems, disk drives, etc., and logical network components, e.g., software, application software, ports, disk drive designation, etc. Those network elements or components that are selected for representation in the model 300 are referred to as managed components. The representation of the managed components includes aspects or properties of the component (i.e., attributes). The relationships between the components, as they will be shown in FIG. 5A, are also represented and contained in the model.

In this exemplary model representation of a home network, exemplary extensions of existing object classes Host 310, Switch 320, UnitaryComputerSystem 330 and ApplicationService 350 are presented. The Host object class, which represents a workstation or server, is extended to include the object class ACS 314. The ACS 314 object class represents the attributes and properties of an Auto-Configuration Server, which uses TR-069 to manage Customer Premise Equipment. The Switch class 320, which represents switches in the network, is extended to include the DSLAM class 322, a Digital Subscriber Line Access Multiplexer. The UnitaryComputerSystem object class 330, which represents a single node computer system, is extended to include the DSL object class 332, HBR object class 334, ONT object class 336, STB object class 338 and OLT object class 340. These object classes describe the attributes and properties of a DSL server, a Home broadband router, an Optical Network Termination, a Set-Top box and an Optical Line Termination, respectively. These components are known in the art and need not be described in detail herein. The ApplicationService object class 350, which describes the general attributes and properties of application services, is extended to include the VoIPSvc object class 353, the VoDSvc object class 354 and the RTIPTVSvc object class 356. These object classes contain specific attributes and properties associated with VoIP, VoD and RTIPTV services, respectively.

Figure 4:
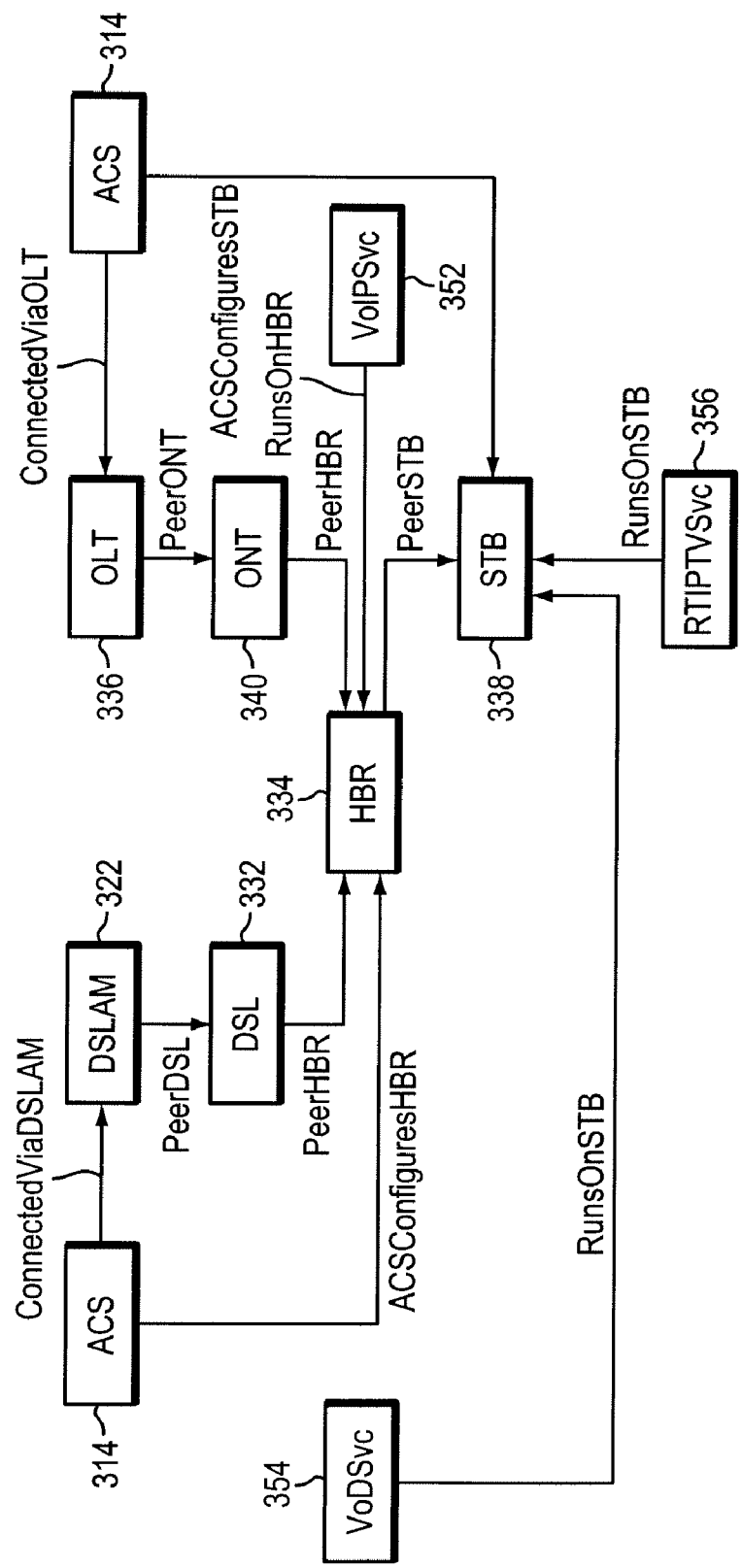
FIG. 4 illustrates a representation of the relationships among the representations of the home network shown in FIG. 3.

FIG. 4 illustrates exemplary relationships or behaviors among the object classes representing the home network elements. In this illustrated example, the HBR object class 334 has a PeerHBR relationship with the DSL object class 332 and the ONT object class 336. Whereas the VoIPSvc has a RunsOnHBR relationship with the HBR object class 334. Similar relationships are illustrated among the home network object classes.

With respect to the model of a home network described herein, a system analysis may be performed based on a correlation function similar to that disclosed in the aforementioned commonly-owned US patents and US patent application. In one aspect the system analysis may be a root-cause determination or an impact analysis.

In determining causes of failures, symptom(s) generally associated with the failure may or may not be generated or detected that indicate a component is experiencing failures. A root-cause correlation must be powerful enough to be able to deal with scenarios in which symptoms are generated, or not generated, to indicate the cause of the failure. An analysis, e.g., a root cause analysis, of the home network, similar to that described in the aforementioned related US patents and patent applications, the disclosures of which are incorporated by reference, herein, may be used to determine from the exemplary causality or behavior model(s) shown, herein. As described in the related US patents and patent applications a determination of a measure of the elements of the causality matrix shown may be used to determine the most likely root cause of the one or more of the observed symptoms.

Figure 1B:
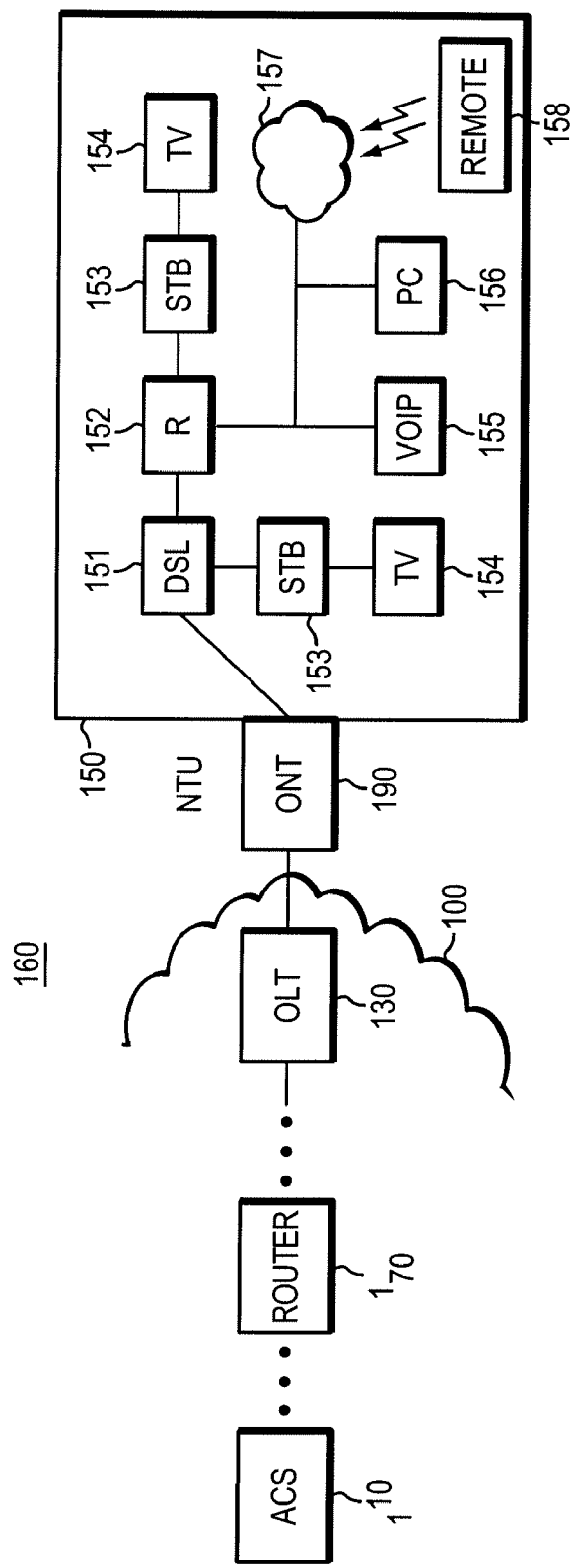

FIG. 5A illustrates exemplary cause/impact analysis of home network shown in FIG. 1B. As described in the related US patents and patent applications a determination of a measure of the elements of the causality matrix shown may be used to determine the most likely root cause of the one or more of the observed symptoms. For example, a problem in the DLSAM, such as the DLSAM being down, may cause the VoIP and VoD services to be down (i.e., no service) and/or the STB to be unavailable (down). Similarly, an indication of a VoD service being degraded (i.e., poor picture quality) may be caused by a signal degradation at the STB. FIG. 5B illustrates an exemplary causality matrix suitable for root-cause correlation function based on the models shown in FIGS. 3 and 4, suitable for the home network shown in FIG. 1B, with regard to the methods described in the common-owned above-referred to US patents and patent applications. For example, when aVOD-Svc (VoD service) symptom is detected a cause of the problem may be determined as being one of STB High Resource Utilization, STB signal degraded or HBR High Packet. However, with the substantially concurrent detection of symptoms referred to as STB Degraded Event and VoIP-SVC (VoIP Service) the cause of a observed events (symptoms) may be determined to be HBR High Packet Rate. Similar determination of the cause of the generation of one or more symptoms may be determined by associating the observed symptoms with the likely causes of the symptoms (i.e., causing events or problems). In another aspect of the invention, an impact analysis, i.e., the affect of a failure, on the home network system. In this case, it may be determined what symptoms may be expected when a problem is introduced or simulated. For example, the introduction of an HBR-Down problem would impact STB, VoD service (VOD-SVC), RtIPTV, and the VoIP Service (VoIP-Svc).

Although the examples provided herein are with regard to root-cause analysis and impact analysis, it would be recognized that the method described herein may be used to perform a system analysis may include: fault detection, fault monitoring, performance, congestion, connectivity, interface failure, node failure, link failure, routing protocol error, and/or routing control errors.

In another aspect of the invention, a system may be represented by one or more domains containing common functionally components of which the home network elements may be represented by at least one domain. In this case, the mostly likely event(s) associated with each domain may be generated by the symptoms detected in each domain and the most likely event(s) correlated to determine a most-likely event(s) for an overall cause of the generation of the symptoms. In this case, the symptoms or observable events may be associated with components or elements associated with at least two domains—i.e., an intersection point or an association—and the analysis may be preformed with regard to these intersection points. For example, a determination of a cause or causes of a set of observed symptoms may be separately generated by the home network and correlated to a cause or causes of a set of observed symptoms generated in the connecting network. A most-likely cause of each set of observed symptoms may then be determined. Discussion of using a plurality of domains to represent systems is more fully disclosed in co-pending U.S. patent application Ser. No. 10/813,842, the contents of which are incorporated by reference herein. In this case, either the ONT object class 336 or the DSL object class 332 may serve as the intersection points between the home network domain and the network domain.

Similarly, an impact analysis may be performed from the causality matrix shown in FIG. 5B. In this case, the impact or effect of a router (HBR object) failing may be determined to cause a degradation in, or even loss of, VoIP services.

Although the system analysis has been described with regard to a root-cause analysis, it would be recognized by those skilled in the art that fault detection, fault monitoring, performance, congestion, connectivity, interface failure, node failure, link failure, routing protocol error, routing control errors analysis may also be performed.

FIG. 6 illustrates an exemplary embodiment of a system 600 that may be used for implementing the principles of the present invention. System 600 may contain one or more input/output devices 602, processors 603 and memories 604. I/O devices 602 may access or receive information from one or more sources or devices 601. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTER- NET, LAN, WAN and/or private networks, e.g., INTRANET, as well as portions or combinations of these and other types of networks.

Input/output devices 602, processors 603 and memories 604 may communicate over a communication medium 625. Communication medium 625 may represent, for example, a bus, a communication network, one or more internal connections of a circuit, circuit card or other apparatus, as well as portions and combinations of these and other communication media. Input data from the sources or client devices 601 is processed in accordance with one or more programs that may be stored in memories 604 and executed by processors 603. Memories 604 may be any magnetic, optical or semiconductor medium that is loadable and retains information either permanently, e.g. PROM, or non-permanently, e.g., RAM. Processors 603 may be any means, such as general purpose or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 604. The code may be read or downloaded from a memory medium 683, an I/O device 685 or magnetic or optical media, such as a floppy disk, a CD-ROM or a DVD, 687 and then stored in memory 604 or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 601 received by I/O device 602, after processing in accordance with one or more software programs operable to perform the functions illustrated herein, may also be transmitted over network 680 to one or more output devices represented as display 685, reporting device 690 or second processing system 695 or over network 650 to one or more devices 601.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform a system analysis which may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method, operable on a computer system, for managing and performing an analysis on a home network system containing a plurality of components, the method comprising the steps of:

representing selected ones of the plurality of components and the relationship among the components, wherein said selected components are represented as network non-specific entities selected from the group consisting of: Auto-Configuration Server (ACS), Digital Subscriber Line Access Multiplexer (DSLAM), Digital Subscriber Line (DSL), Home Broadband Router (HBR), Optical Network Termination (ONT), Set-Top Box (STB), Optical Line Termination (OLT), Voice Over Internet Protocol (VoIP) Service (VoIPSv), Video on Demand (VoD) Services (VoDSvs) and Real Time Internet Protocol Television Service (RTIPTVSvc), and the relationships represent relations along which events propagate among the selected components, wherein the relationships are selected from the group consisting of: ConnectedViaDSLAM, PeerDSL, ConnectedViaOLT, PeerONT, PeerSTB, ACSConfigures HBR, ACSConfiguresSTB and RunsOnSTB;

providing a mapping between a plurality of events and a plurality of observable events occurring among the components, wherein the mapping is represented as a value associating each event with each observable event, and performing the system analysis based on the mapping of events and observable events.

2. The method as recited in claim 1, further comprising the steps of:

determining at least one likely event based on at least one of the plurality of observable events by determining a mismatch measure based on the values associated with the plurality of observable events and the plurality of events.

3. The method as recited in claim 1, further comprising the step of:

detecting at least one observable event based on at least one of the plurality of events.

4. The method as recited in claim 1, wherein the analysis is selected from the group consisting of: fault detection, fault monitoring, performance, congestion, connectivity, interface failure, node failure, link failure, routing protocol error, routing control errors, and root-cause analysis.

5. An apparatus for managing and performing an analysis on a home network composed of a plurality of components, the apparatus comprising:

a processor in communication with a memory, the processor executing code for:

referring to a representation of selected ones of the plurality of components and the relationship among the components, wherein said selected components are represented as network non-specific entities selected from the group consisting of: Auto-Configuration Server (ACS), Digital Subscriber Line Access Multiplexer (DSLAM), Digital Subscriber Line (DSL), Home Broadband Router (HBR), Optical Network Termination (ONT), Set-Top Box (STB), Optical Line Termination (OLT), Voice Over Internet Protocol (VoIP) Service (VoIPSv), Video on Demand (VoD) Services (VoDSvs) and Real Time Internet Protocol Television Service (RTIPTVSvc), and the relationships represent relations along which events propagate among the selected components, wherein the relationships are selected from the group consisting of: ConnectedViaDSLAM, PeerDSL, ConnectedViaOLT, PeerONT, PeerSTB, ACSConfigures HBR, ACSConfiguresSTB and RunsOnSTB;

accessing a mapping between a plurality of events and a plurality of observable events occurring among the components, wherein the mapping is represented as a value associating each event with each observable event, and performing the analysis based on the mapping of events and observable events.

6. The apparatus as recited in claim 5, wherein the processor further executing code for:

determining at least one likely event based on at least one of the plurality of observable events by determining a mismatch measure based on the values associated with the plurality of observable events and the plurality of events.

7. The apparatus as recited in claim 5, wherein the processor further executing program code for:

detecting at least one observable event based on at least one of the plurality of events.

8. The apparatus as recited in claim 5, wherein the analysis is selected from the group consisting of: fault detection, fault monitoring, performance, congestion, connectivity, interface failure, node failure, link failure, routing protocol error, routing control errors, and root-cause analysis.

9. The apparatus as recited in claim 5, further comprising:
an input/output device, in communication with the processor.

10. The apparatus as recited in claim 5, wherein the code is stored in the memory.

11. A method for performing an analysis on a home network composed of a plurality of components, the method comprising the steps of:

representing selected ones of the plurality of components and the relationship among the components associated with the home network, wherein said selected components are represented as network non-specific entities selected from the group consisting of: Auto-Configuration Server (ACS), Digital Subscriber Line Access Multiplexer (DSLAM), Digital Subscriber Line (DSL), Home Broadband Router (HBR), Optical Network Termination (ONT), Set-Top Box (STB), Optical Line Termination (OLT), Voice Over Internet Protocol (VoIP) Service (VoIPSv), Video on Demand (VoD) Services (VoDSvs) and Real Time Internet Protocol Television Service (RTIPTVSvc), and the relationships represent relations along which events propagate among the selected components, wherein the relationships are selected from the group consisting of: ConnectedViaDSLAM, PeerDSL, ConnectedViaOLT, PeerONT, PeerSTB, ACSConfigures HBR, ACSConfiguresSTB and RunsOnSTB;

providing a mapping between a plurality of events and a plurality of observable events occurring among the components, wherein the mapping is represented as a value associating each event with each observable event, and performing the analysis based on the mapping of events and observable events.

12. The method as recited in claim 11, wherein the analysis comprises the steps of:

determining at least one likely event based on at least one of the plurality of observable events by determining a mismatch measure based on the values associated with the plurality of observable events and the plurality of events.

13. The method as recited in claim 11, wherein the analysis comprises the step of:

detecting at least one observable event based on at least one of the plurality of events.

14. The method as recited in claim 11, wherein the analysis is selected from the group consisting of: fault detection, fault monitoring, performance, congestion, connectivity, interface failure, node failure, link failure, routing protocol error, routing control errors, and root-cause analysis.

15. An apparatus for performing an analysis on a system including a home network, represented as a plurality of domains wherein the home network is represented as at least one domain, and is composed of a plurality of components, the apparatus comprising:

a processor in communication with a memory, the processor executing code for:

representing selected ones of the plurality of components and the relationship among the components associated with the home network, wherein said selected components are represented as network non-specific entities selected from the group consisting of: Auto-Configuration Server (ACS), Digital Subscriber Line Access Multiplexer (DSLAM), Digital Subscriber Line (DSL), Home Broadband Router (HBR), Optical Network Termination (ONT), Set-Top Box (STB), Optical Line Termination (OLT), Voice Over Internet Protocol (VoIP) Service (VoIPSv), Video on Demand (VoD) Services (VoDSvs) and Real Time Internet Protocol Television Service (RTIPTVSvc), and the relationships represent relations along which events propagate among the selected components, wherein the relationships are selected from the group consisting of: ConnectedViaDSLAM, PeerDSL, ConnectedViaOLT, PeerONT, PeerSTB, ACSConfigures HBR, ACSConfiguresSTB and RunsOnSTB;

accessing a mapping between a plurality of events and a plurality of observable events occurring among the components, wherein the mapping is represented as a value associating each event with each observable event, and performing the analysis based on the mapping of events and observable events.

16. The apparatus as recited in claim 15, wherein the processor further executing code for:

accessing, for each of the domains, a mapping between a plurality of observable events and a plurality of events for the components within the domain, wherein at least one of the observable events is associated with a components associated with at least two of the domains.

17. The apparatus as recited in claim 15, wherein the processor performing the analysis by executing code for:

determining at least one likely event based on at least one of the plurality of observable events by determining a mismatch measure based on the values associated with the plurality of observable events and the plurality of events.

18. The apparatus as recited in claim 17, wherein the processor further executing code for:

determining at least one likely event based on at least one of the plurality of observable events, provided by each of said domains, by determining a mismatch measure based on the values associated with the plurality of observable events and the plurality of events.

19. The apparatus as recited in claim 15, wherein the processor further executing program code for:

detecting at least one observable event based on at least one of the plurality of events.

20. The apparatus as recited in claim 15, wherein the analysis is selected from the group consisting of: fault detection, fault monitoring, performance, congestion, connectivity, interface failure, node failure, link failure, routing protocol error, routing control errors, and root-cause analysis.

* * * * *